(12) United States Patent
Fitzpatrick

(10) Patent No.: US 7,617,664 B1
(45) Date of Patent: Nov. 17, 2009

(54) ROTARY CUTTING BLADE ASSEMBLY

(76) Inventor: Kevin E. Fitzpatrick, 855 Pine Ridge Dr., Plantation, FL (US) 33317

( * ) Notice: Subject to any disclaimer, the term of this patent is extended or adjusted under 35 U.S.C. 154(b) by 261 days.

(21) Appl. No.: 11/223,640

(22) Filed: Sep. 9, 2005

(51) Int. Cl.
*A01D 34/73* (2006.01)
*A01D 34/82* (2006.01)

(52) U.S. Cl. ............... 56/295; 56/255; 56/DIG. 17; 56/DIG. 20; 30/347; 83/663; 241/292.1

(58) Field of Classification Search ............ 56/255, 56/295, 503, DIG. 17, DIG. 20, 17.5, 122, 56/294; 30/276, 347, 353, 355, 356; 241/282.1, 241/282.2, 292.1; 83/663, 665, 666; 99/205, 99/314; 172/15, 123; 366/205, 343; D7/412; D8/8; D15/14
See application file for complete search history.

(56) References Cited

U.S. PATENT DOCUMENTS

| | | | | | |
|---|---|---|---|---|---|
| 1,744,597 | A | * | 1/1930 | Vasconcellos | 172/556 |
| 2,517,405 | A | * | 8/1950 | Moss | 56/295 |
| 2,857,729 | A | * | 10/1958 | Zoldok | 56/295 |
| 3,087,298 | A | * | 4/1963 | Phillips Sr. | 56/295 |
| 3,109,275 | A | * | 11/1963 | Dunlap et al. | 56/295 |
| 3,183,655 | A | * | 5/1965 | Dunlap et al. | 56/295 |
| 3,686,841 | A | * | 8/1972 | Mager et al. | 56/17.5 |
| 4,072,195 | A | * | 2/1978 | Carlson | 172/15 |
| 4,722,608 | A | * | 2/1988 | Salzman et al. | 366/330.5 |
| 5,033,259 | A | * | 7/1991 | Adcock | 56/295 |
| 5,311,727 | A | * | 5/1994 | Fassauer | 56/12.8 |
| 5,345,788 | A | * | 9/1994 | Jerry | 56/255 |
| 5,566,534 | A | * | 10/1996 | Fassauer | 56/12.8 |
| 6,301,868 | B1 | * | 10/2001 | Siplinger | 56/295 |
| 6,470,662 | B1 | * | 10/2002 | Burke et al. | 56/255 |
| 6,640,449 | B1 | * | 11/2003 | Hoffmann et al. | 30/347 |
| 2002/0152736 | A1 | * | 10/2002 | Hasei et al. | 56/295 |

\* cited by examiner

*Primary Examiner*—Clark F. Dexter
(74) *Attorney, Agent, or Firm*—Gold & Rizvi, P.A.; H. John Rizvi; Glenn E. Gold

(57) ABSTRACT

An improved rotary cutting blade assembly which is characterized by reduced friction and enhanced cutting efficiency is disclosed. The improved rotary cutting blade includes a rotary cutting blade having a blade hub, a plurality of blade arms extending outwardly from the blade hub and a plurality of blade winglets carried by the plurality of blade arms, respectively.

18 Claims, 4 Drawing Sheets

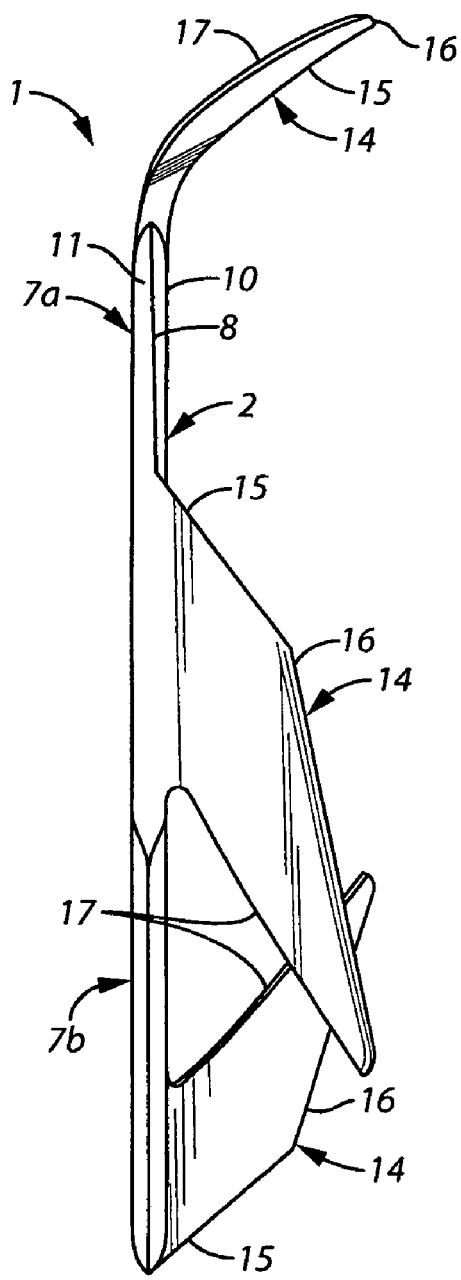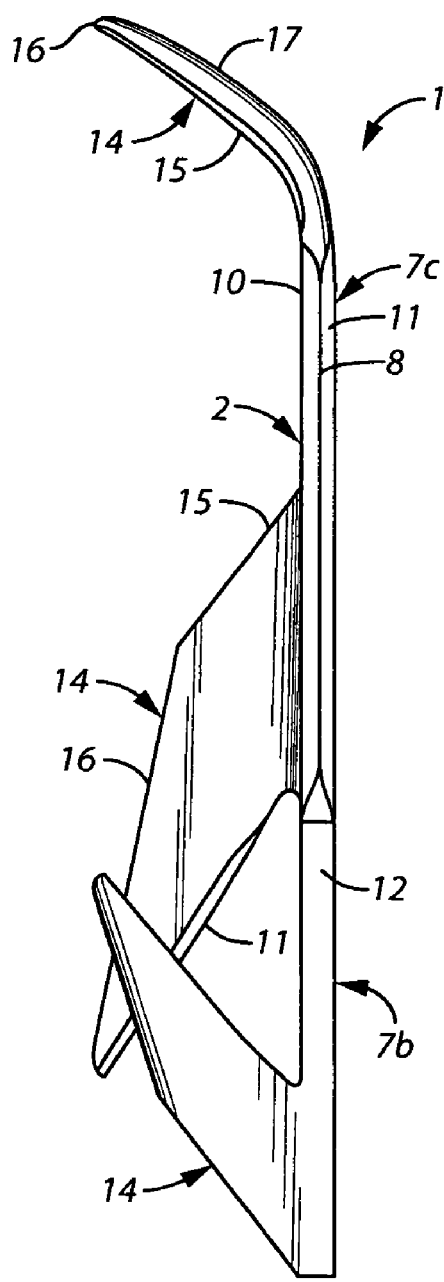
FIG. 6              FIG. 7

ROTARY CUTTING BLADE ASSEMBLY

FIELD OF THE INVENTION

The present invention relates generally to cutting blades for lawn mowers and other cutting apparatuses. More particularly, the present invention relates to an improved rotary cutting blade assembly which includes a rotary cutting blade including multiple, generally semicircular blade arms having tapered back blades and winglets to reduce friction, enhance rotational inertia and improve cutting efficiency of the blade.

BACKGROUND OF THE INVENTION

Various types of lawn mowers, including riding lawn mowers and push mowers, for example, are known in the art. Such mowers typically include a blade assembly having a rotary cutting blade, a mower engine which rotates the cutting blade, and wheels which facilitate transport of the mower. Mowers may also be equipped with a conduit and blower assembly for distributing clippings from the blade assembly to a hopper.

A conventional blade assembly for a lawn mower typically includes an elongated, flat rotary cutting blade the middle of which is mounted to a blade shaft. Each leading edge of the blade is tapered to cut grass. The weight of the blade is substantially evenly distributed along the entire length of the blade. Some blade assemblies may include two or more cutting blades.

As it is rotated on the blade shaft by the mower engine, the flat rotary cutting blade encounters resistance friction from three different sources. First, the blade encounters friction when it initially contacts and cuts the grass or other material being cut. Second, the flat bottom of the blade encounters the upper end of the grass or material which was just cut by the blade. Third, the blade encounters friction from air and cut grass fragments or material which swirls around inside the blade housing of the mower.

The conventional rotary cutting blade suffers from several drawbacks. First, when it encounters friction as described above, the blade loses inertia due to the even weight distribution along the entire length of the blade. This inhibits the cutting efficiency of the blade. Second, due to the shape of the blade, air flow resistance is inherently high. Third, the blade contacts grass at a 90 degree angle and on a 1:1 ratio (the blade typically cuts the grass once each time it contacts the grass), and also tends to smash and tear, rather than cut and slice, the grass.

There is therefore an established need for an improved cutting blade assembly which may be adapted for use in a lawnmower, blender, food processor or other application and which is characterized by substantially increased inertia and reduced friction imparted by a material as the material is cut, mulched, sliced, or blended.

SUMMARY OF THE INVENTION

The present invention is directed to an improved rotary cutting blade assembly having a rotary cutting blade which is adaptable for a variety of cutting applications and is characterized by substantially reduced vulnerability to friction and air resistance forces, as well as enhanced rotational inertia, thus resulting in enhanced cutting efficiency.

An object of the present invention is to provide an improved rotary cutting blade assembly which is adaptable for use in a variety of cutting applications including lawnmowers, blenders and food processors, for example.

Another object of the present invention is to provide an improved rotary cutting blade assembly which is characterized by reduced friction and enhanced cutting efficiency.

Still another object of the present invention is to provide an improved rotary cutting blade assembly in which most of the blade weight is distributed toward the outer half of a rotary cutting blade to enhance rotational inertia of the blade during cutting.

Yet another object of the present invention is to provide an improved rotary cutting blade assembly having a rotary cutting blade which includes multiple, swept-back blade arms and a blade winglet at the end of each blade arm to enhance rotational inertia and promote mulching of grass or other material cut by the blade arms.

A still further object of the present invention is to provide an improved rotary cutting blade assembly having a rotary cutting blade which includes multiple, generally semicircular blade arms with minimal surface area to reduce air resistance and friction as the blade is rotated.

Yet another object of the present invention is to provide an improved rotary cutting blade assembly having a rotary cutting blade which may include multiple, swept-back, generally semicircular blade arms that extend from a central blade hub and widen outwardly from the hub to the ends of the blade arms to impart a majority of weight to the outer circumference of the blade and enhance blade inertia during cutting.

A still further object of the present invention is to provide an improved rotary cutting blade assembly having a rotary cutting blade which includes multiple blade arms that may include a tapered rear edge to generate an airfoil effect and reduce friction imparted by cut grass or other material.

Another object of the present invention is to provide a novel rotary cutting blade assembly having a rotary cutting blade including a central blade hub; multiple, swept-back, generally semicircular blade arms extending from the blade hub; and a blade winglet provided on the end of each blade arm to create an airfoil or vortex which promotes the spinning and mulching of cut grass particles or other material as the blade rotates in addition to imparting weight to the extremities of the blade arm to impart a "gyroscopic flywheel effect" or enhance rotational inertia of the rotary cutting blade.

These and other objects, features and advantages of the present invention will become more readily apparent from the attached drawings and the detailed description of the preferred embodiments, which follow.

BRIEF DESCRIPTION OF THE DRAWINGS

The invention will be further understood, by way of example, with reference to the accompanying drawings, in which:

FIG. 6 is an edge view illustrating one side of the rotary cutting blade; and

FIG. 7 is an edge view illustrating the opposite side of the rotary cutting blade.

DETAILED DESCRIPTION OF THE PREFERRED EMBODIMENTS

Shown throughout the drawings, the present invention is generally directed towards an improved rotary cutting blade assembly which is characterized by reduced friction and enhanced cutting efficiency when used in a lawn mower, blender, food processor or other cutting apparatus.

Figure 1:
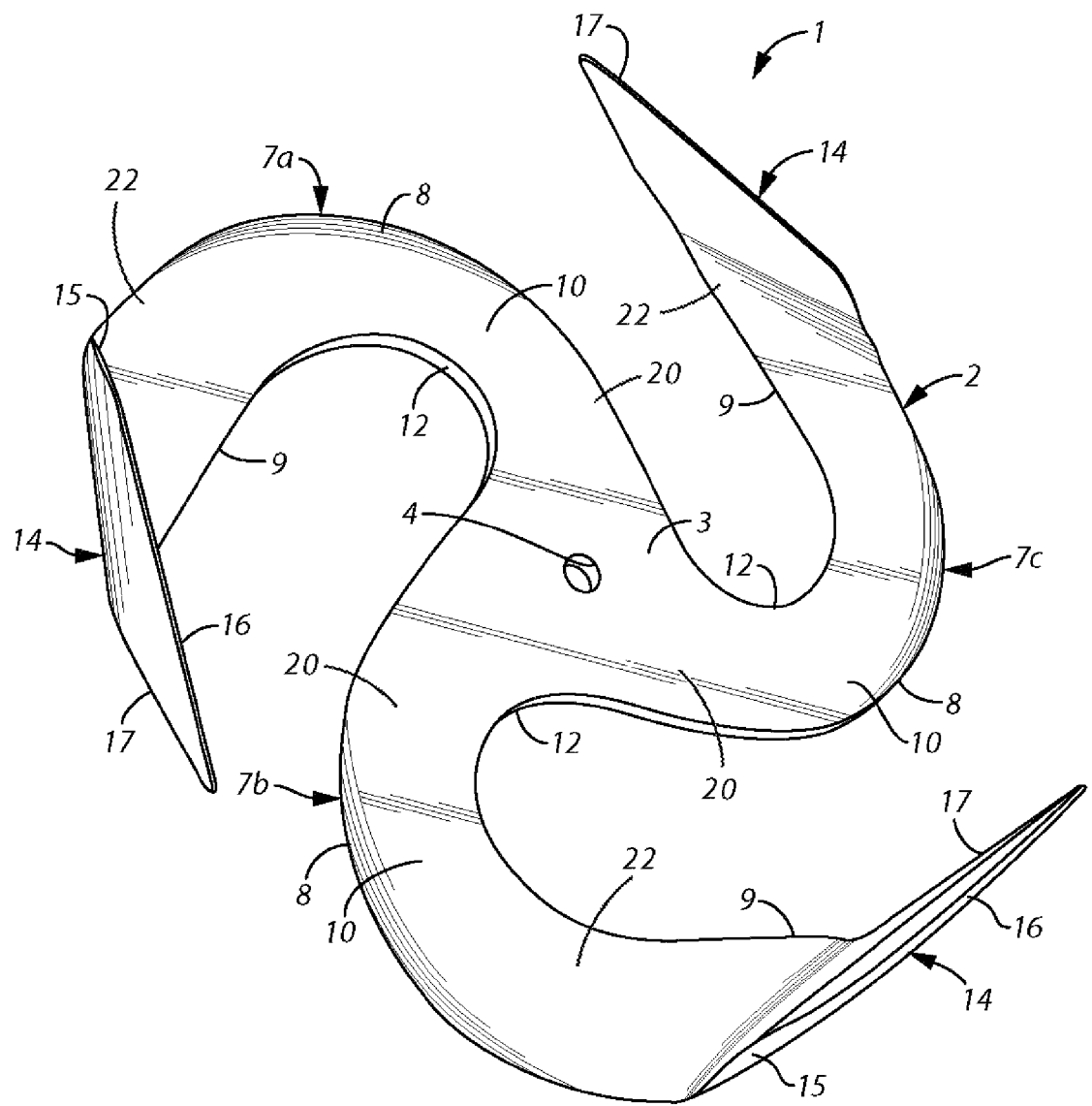
FIG. 1 is a top perspective view of a rotary cutting blade of an improved rotary cutting blade assembly according to the present invention.
Figure 2:
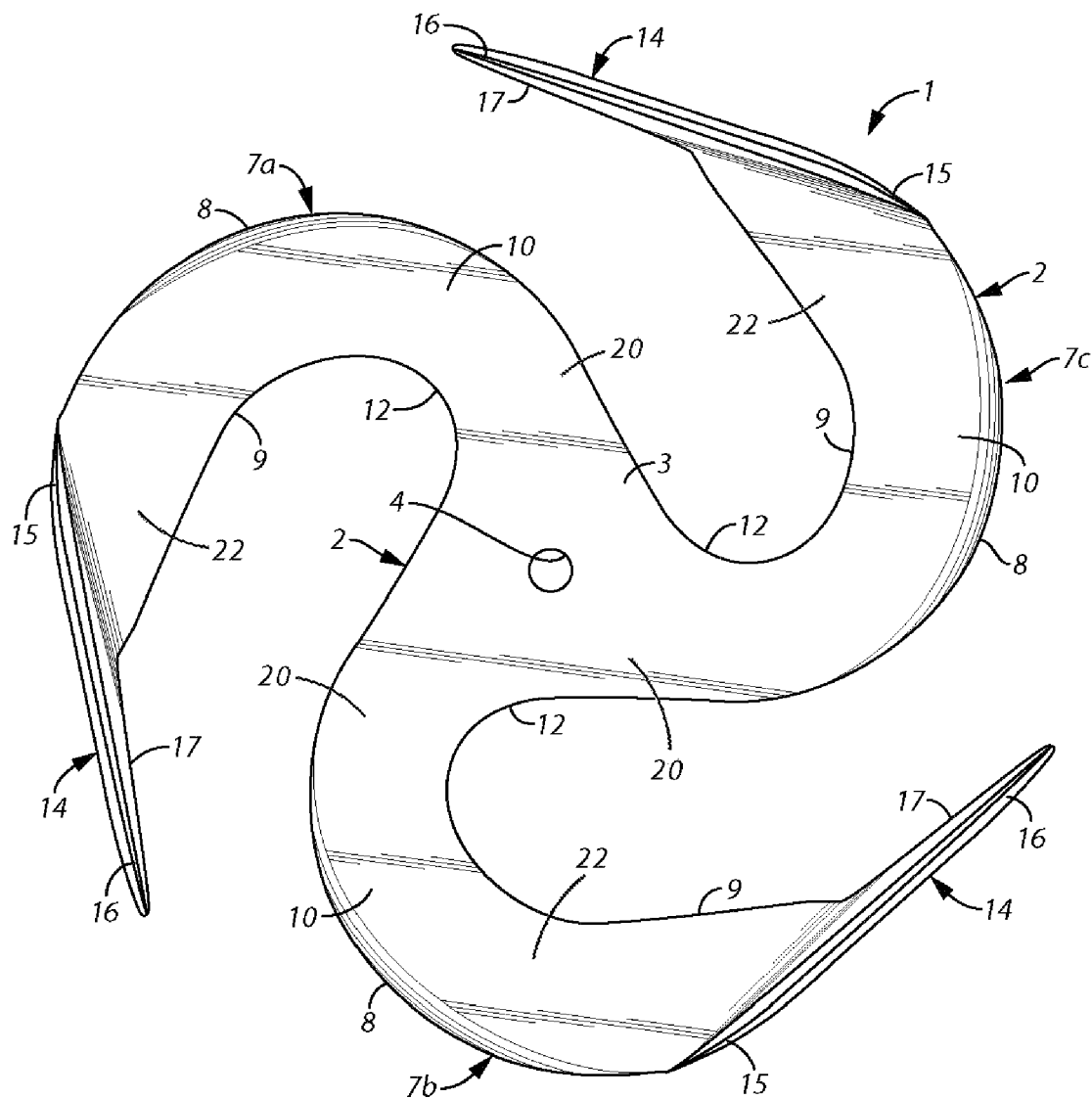
FIG. 2 is a top view of the rotary cutting blade shown in FIG. 1.
Figure 3:
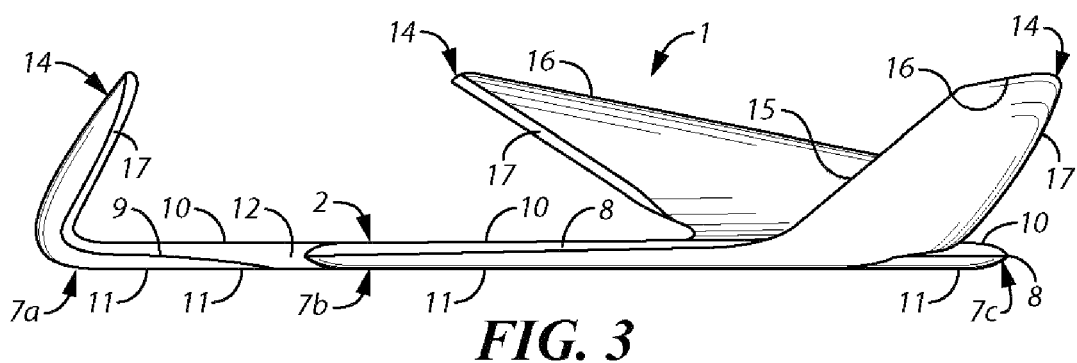
FIG. 3 is an edge view of the rotary cutting blade shown in FIG. 2.
Figure 4:
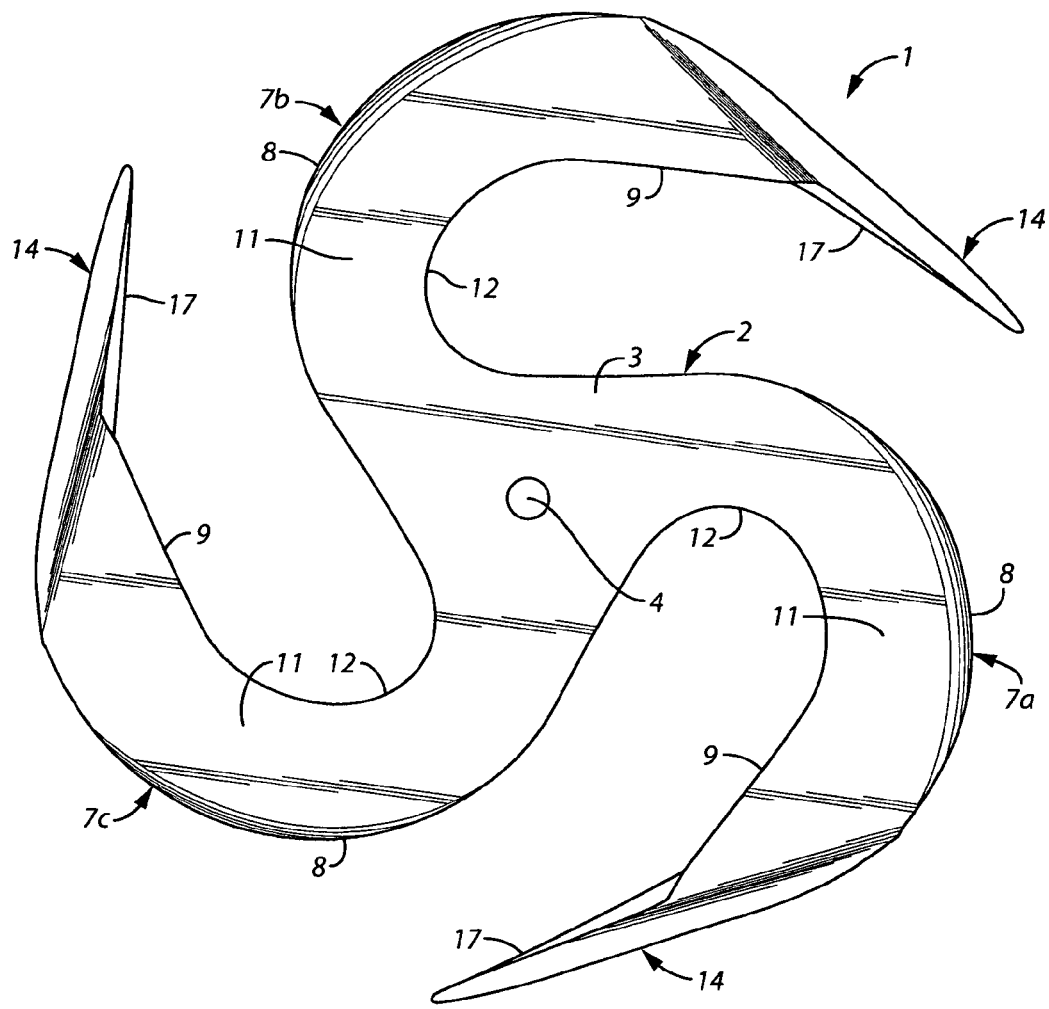
FIG. 4 is a bottom view of the rotary cutting blade.
Figure 5:
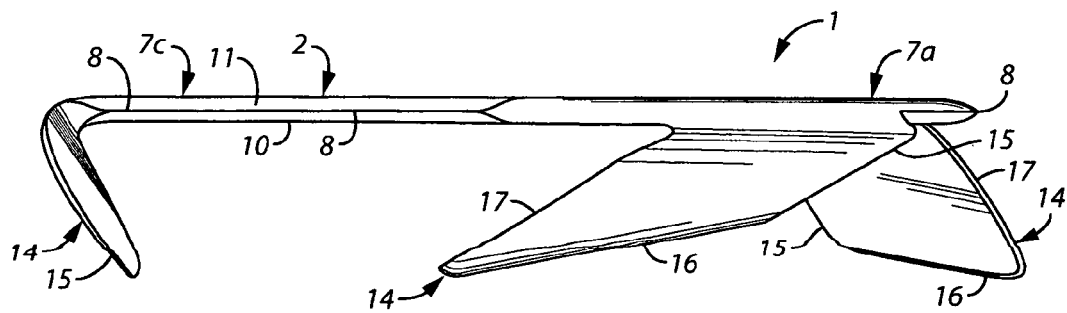
FIG. 5 is an edge view of the inverted rotary cutting blade shown in FIG. 4.

Referring to FIGS. 1-5, an illustrative embodiment of the improved rotary cutting blade assembly is generally indicated by reference numeral 1. The improved rotary cutting blade assembly 1 includes a rotary cutting blade 2 which is typically stainless steel. The rotary cutting blade 2 includes a central blade hub 3. A shaft opening 4 typically extends through the blade hub 3 to facilitate mounting the rotary cutting blade 2 on a motor shaft (not illustrated) that is rotatably engaged by a motor (not illustrated). Multiple blade arms 7 extend from the blade hub 3. For purposes of differentiation in the various views of the drawings, the blade arms 7 of the rotary cutting blade 2 are designated as blade arms 7a, 7b and 7c, respectively. Each of the blade arms 7 typically has a similar or identical construction. Accordingly, as shown in FIGS. 1, 2 and 4, each of the blade arms 7 has a generally semicircular configuration, extending initially forwardly from the blade hub 3 (in counterclockwise fashion when viewed from above) and then bending rearwardly in a "swept-back" trajectory. Each blade arm 7 is relatively narrow at its proximal end portion, where the blade arm 7 joins the blade hub 3, and gradually widens toward its distal end. The generally semicircular configuration of the blade arms 7 maximizes the weight per unit area of each blade arm 7. As illustrated in FIGS. 1, 2 and 4, each blade arm 7 generally has a U-shaped configuration and includes a proximal arm segment 20 which extends from the blade hub 3 and a distal arm segment 22 which extends from the proximal arm segment 20. The distal arm segment 22 of each blade arm 7 is disposed in generally parallel, spaced-apart and adjacent relationship with respect to the proximal arm segment 20 of the adjacent blade arm 7.

As illustrated in FIGS. 2 and 4, each blade arm 7 has an upper blade surface 10 and a lower blade surface 11. As illustrated in FIG. 3, the lower blade surface 11 is preferably slightly angled or tapered upwardly with respect to a horizontal plane, similar to an airfoil. As illustrated in FIGS. 2 and 3, each blade arm 7 includes a tapered front cutting edge 8 which extends along the leading or convex edge of the blade arm 7. Each blade arm 7 also includes a concave rear edge 12 which is continuous with the cutting edge 8 of the adjacent blade arm 7. A tapered rear edge 9 extends at least along the outer portion of the concave edge 12 of the blade arm 7.

A blade winglet 14 terminates each blade arm 7. As illustrated in FIG. 3, each blade winglet 14 typically extends at typically about a 90-degree or less angle with respect to the up and/or down plane of the corresponding blade arm 7. Each blade winglet 14 includes a tapered winglet cutting edge 15 which is continuous with the cutting edge 8 of the blade arm 7, a winglet upper edge 16 which is continuous with the winglet cutting edge 15, and a winglet rear edge 17 which is continuous with the winglet upper edge 16. The winglet rear edge 17 is continuous with the rear edge 9 of the blade arm 7. The winglet upper edge 16 is preferably slightly inclined with respect to a horizontal plane from the winglet cutting edge 15 to the winglet rear edge 17.

In the rotary cutting blade 2, more than 50% of the weight of each blade arm 7 is preferably distributed on the outer half of the blade arm 7. This is due to the added weight which each blade winglet 14 applies to the corresponding blade arm 7, as well as the increasing width of each blade arm 7 from the blade hub 3 to the blade winglet 14 and the generally circular configuration of the rotary cutting blade 2. Such a weight distribution imparts a gyroscopic effect to the rotary cutting blade 2 as the rotary cutting blade 2 rotates in a cutting action, which will be hereinafter described. The gyroscopic effect imparts inertia to the blade arms 7 to maintain a constant rotational speed and enhance the cutting efficiency of the rotary cutting blade 2.

While use of the improved rotary cutting blade assembly 1 will be hereinafter described with respect to use in a lawnmower, it will be understood that the improved rotary cutting blade assembly 1 can be adapted for use in any type of cutting implement including but not limited to lawnmowers, blenders and food processors or any application in which it is desired to cut, mince, mulch or chop a material. The improved rotary cutting blade assembly 1 includes a blade shaft (not illustrated) which is typically engaged by a mower engine (not illustrated) on a mower (not illustrated). The rotary cutting blade 2 is mounted on the blade shaft inside the mower housing, with the blade shaft extending through the shaft opening 4 of the blade hub 3. The blade shaft, mower engine and mower housing elements of the mower may be conventional.

The mower engine rotates the blade shaft and the rotary cutting blade 2 in a clockwise direction when viewed from above, as in FIGS. 1 and 2, to cut grass (not illustrated). Accordingly, the cutting edge 8 of each blade arm 7 initially contacts the grass at a generally 45-degree angle (typically between about 20 degrees and about 60 degrees). The cutting edge 8 slices through the grass, cutting grass segments from the grass blades in a clean cut. Furthermore, due to the typically upwardly-inclined tapered lower blade surface 11, each blade arm 7 tends to lift and cut the grass. After being cut, the cut grass segments of the grass blades tend to swirl around in the mower housing, due to the centrifugal force imparted on the grass segments after they are cut from the grass blades. This centrifugal force throws the cut grass segments outwardly toward the blade winglets 14. Therefore, as rotational motion of the rotary cutting blade 2 continues, the winglet cutting edges 15 of the blade winglets 14 on the ends of the respective blade arms 7 again cut the swirling grass segments. Consequently, the blade arms 7 and blade winglets 14 progressively mulch or chop the cut grass segments into increasingly smaller pieces. Furthermore, each blade winglet 14 acts as an airfoil and creates a vortex which tends to cause swirling of the grass segments behind each blade winglet 14. This vortex discharges the swirling grass segments into contact with the winglet cutting edge 15 of the next blade winglet 14, thereby promoting cutting of the grass segments into progressively smaller pieces. Therefore, each blade arm 7/blade winglet 14 combination acts as a three-dimensional cutting implement, with the cutting edge 8 of each blade arm 7 acting as a primary cutting surface and the winglet cutting edge 15 of each blade winglet 14 acting as a secondary cutting surface. This enables the rotary cutting blade 2 to cut the grass in at least a 2:1 ratio (along the cutting edge 8 and winglet cutting edge 15), and as high as a 5:1 or 10:1 ratio (along the winglet upper edge 16), for the first inch of grass cut.

The unique design of the rotary cutting blade 2 minimizes air resistance and friction while enhancing rotational inertia of the rotary cutting blade 2 during the mowing operation. Because over 50% of the weight of the rotary cutting blade 2 is typically distributed on the distal half of the blade arms 7 (due to the presence of the blade winglets 14 on the ends of the blade arms 7, gradual widening of each blade arm 7 from the blade hub 3 to the blade winglet 14 and the circular configuration of the rotary cutting blade 2), the rotary cutting blade 2 is subjected to a gyroscopic flywheel effect as it is rotated. This effect maintains the rotational inertia of the rotary cutting blade 2 as it contacts and cuts the grass while the rotational speed of the rotary cutting blade 2 remains constant. Furthermore, because the lower blade surface 11 of each blade arm 7 has a tapered or angled profile, the upper ends of the previously-cut grass blades contact only a relatively small surface area of the blade arm 7 as the rotary cutting blade 2 is rotated. Also, the generally semicircular configuration of each blade arm 7 minimizes the surface area of the upper blade surface 10 and lower blade surface 11 which is available for contact with air, the grass as it is cut and the swirling grass segments inside the mower housing. Moreover, the winglet rear edge 17 of each blade winglet 14 and rear edge 9 of each blade arm 7 are tapered, thus reducing air resistance and friction of the blade winglet 14 and blade arm 7, respectively, against air and the cut grass segments which continue to swirl in the mower housing, respectively. Another design expedient which reduces air resistance on the rotary cutting blade 2 is the swept-back configuration of the blade arms 7. As in the case of the swept-back wings of a jet airplane, the swept-back configuration of the blade arms 7 minimizes drag on the rotating blade 2.

While the preferred embodiments of the invention have been described above, it will be recognized and understood that various modifications can be made in the invention and the appended claims are intended to cover all such modifications which may fall within the spirit and scope of the invention.

What is claimed is:

1. A rotary cutting blade comprising:
a blade hub;
a plurality of blade arms each having a convex cutting edge, each blade arm including a proximal arm segment extending outwardly from said blade hub and a distal arm segment extending from said proximal arm segment;
wherein said distal arm segments of said plurality of blade arms are substantially coplanar with each other, and wherein each of said distal arm segments has an edge that is oriented in substantially parallel, spaced-apart relationship with respect to an edge of the proximal arm segment of an adjacent one of said plurality of blade arms; and
a blade winglet extending transversely from a distal end of each of said plurality of blade arms.

2. The rotary cutting blade of claim 1 wherein each of said blade arms widens from said blade hub to said blade winglet.

3. The rotary cutting blade of claim 1 wherein each of said blade arms has an upper blade surface and a tapered lower blade surface.

4. The rotary cutting blade of claim 1 wherein each of said blade arms has a generally semicircular, swept-back configuration.

5. The rotary cutting blade of claim 1 wherein each of said blade arms has the cutting edge on a front edge and a tapered rear edge.

6. The rotary cutting blade of claim 1 wherein each of said blade winglets comprises a winglet cutting edge, a winglet upper edge continuous with said winglet cutting edge and a winglet rear edge continuous with said winglet upper edge.

7. The rotary cutting blade of claim 1 wherein said blade winglets are disposed at about a 90-degree angle with respect to said blade arms, respectively.

8. The rotary cutting blade of claim 1 wherein over 50 percent of a total weight of said rotary cutting blade is distributed on an outer half of said blade arms.

9. A rotary cutting blade comprising:
a blade hub;
a plurality of generally semicircular blade arms extending outwardly from said blade hub in a swept-back configuration and each having a convex cutting edge and a concave edge, said blade arms extending from said blade hub substantially along a plane;
a blade winglet terminating each of said plurality of blade arms, each said winglet extending transversely with respect to said plane; and
wherein each of said plurality of blade arms gradually and continually widens progressively from a portion of said blade arm proximate said blade hub to said blade winglet, respectively.

10. The rotary cutting blade of claim 9 wherein each of said blade arms has an upper blade surface and a tapered lower blade surface.

11. The rotary cutting blade of claim 9 further comprising a tapered rear edge extending along at least a portion of said concave edge.

12. The rotary cutting blade of claim 9 wherein each of said blade winglets comprises a winglet cutting edge continuous with said convex cutting edge, a winglet upper edge continuous with said winglet cutting edge and a winglet rear edge continuous with said winglet upper edge.

13. The rotary cutting blade of claim 12 further comprising a tapered rear edge extending along at least a portion of said concave edge and wherein said winglet rear edge is continuous with said tapered rear edge.

14. The rotary cutting blade of claim 9 wherein said blade winglets are disposed at about a 90-degree angle with respect to said blade arms, respectively.

15. The rotary cutting blade of claim 9 wherein over 50 percent of a total weight of said rotary cutting blade is distributed on an outer half of said blade arms.

16. A rotary cutting blade assembly comprising:
a blade hub;
a plurality of generally semicircular blade arms, each arm having a proximal arm segment extending outwardly from said blade hub and a distal arm segment extending from said proximal arm segment in a swept-back configuration and each arm having a convex cutting edge and a concave edge;
a blade winglet terminating each said blade arm, each of said blade winglets having a winglet cutting edge continuous with said convex cutting edge, a winglet upper edge continuous with said winglet cutting edge and a winglet rear edge continuous with said winglet upper edge;
wherein each of said distal arm segments is oriented in parallel, spaced-apart relationship with respect to the proximal arm segment of an adjacent one of said plurality of blade arms;
wherein over 50 percent of a total weight of said rotary cutting blade is distributed on an outer half of said blade arms; and
wherein each of said plurality of blade arms gradually and continually widens progressively from said blade hub to said blade winglets, respectively.

17. The rotary cutting blade of claim 16 wherein each of said blade arms has an upper blade surface and a tapered lower blade surface.

18. The rotary cutting blade of claim 16 further comprising a tapered rear edge extending along at least a portion of said concave edge and continuous with said winglet rear edge.

* * * * *